United States Patent
Busbey et al.

(10) Patent No.: US 9,145,867 B2
(45) Date of Patent: Sep. 29, 2015

(54) SYSTEM AND METHOD FOR INSTALLING A BLADE INSERT BETWEEN SEPARATE PORTIONS OF A WIND TURBINE ROTOR BLADE

(71) Applicant: General Electric Company, Schenectady, NY (US)

(72) Inventors: Bruce Clark Busbey, Greenville, SC (US); James Alphonse Payant, Mount Vernon, WA (US); Robert Roy Anderson, Mount Vernon, WA (US)

(73) Assignee: General Electric Company, Schenectady, NY (US)

( * ) Notice: Subject to any disclaimer, the term of this patent is extended or adjusted under 35 U.S.C. 154(b) by 265 days.

(21) Appl. No.: 13/803,176

(22) Filed: Mar. 14, 2013

(65) Prior Publication Data
US 2014/0259669 A1 Sep. 18, 2014

(51) Int. Cl.
*F03D 1/00* (2006.01)
*B29C 31/00* (2006.01)
*B23K 37/053* (2006.01)
*F03D 1/06* (2006.01)

(52) U.S. Cl.
CPC .............. *F03D 1/001* (2013.01); *F03D 1/0675* (2013.01); *B23K 37/053* (2013.01); *B29C 31/00* (2013.01); *F03D 1/065* (2013.01); *F05B 2230/60* (2013.01); *F05B 2230/604* (2013.01); *F05B 2230/61* (2013.01); *F05B 2240/302* (2013.01); *Y02E 10/721* (2013.01); *Y10T 29/49337* (2015.01); *Y10T 29/53983* (2015.01)

(58) Field of Classification Search
CPC ..... F03D 1/001; F03D 1/0675; F03D 1/0633; Y02E 10/721; Y10T 29/49337; Y10T 29/53983; F05B 2230/61; F05B 2240/302; F05B 2230/604; F05B 2230/60
See application file for complete search history.

(56) References Cited

U.S. PATENT DOCUMENTS

| | | | |
|---|---|---|---|
| 2,500,204 A * | 3/1950 | Ronay | 228/44.5 |
| 2010/0310379 A1 | 12/2010 | Livingston | |
| 2011/0142667 A1 | 6/2011 | Miebach et al. | |
| 2011/0142675 A1 | 6/2011 | Van der Bos | |
| 2015/0056081 A1* | 2/2015 | De Waal Malefijt | 416/241 R |

FOREIGN PATENT DOCUMENTS

WO   WO 2013113817 A1 *   8/2013

OTHER PUBLICATIONS

International Search Report and Written Opinion issued in connection with corresponding PCT Application No. PCT/US2014/031164 on Jun. 26, 2014.

* cited by examiner

*Primary Examiner* — David Bryant
*Assistant Examiner* — Jun Yoo
(74) *Attorney, Agent, or Firm* — Dority & Manning, P.A.

(57) ABSTRACT

A system for installing a blade insert between a root portion and a tip portion of a rotor blade of a wind turbine is disclosed. The system may include a root cradle assembly configured to support the root portion of the rotor blade and a tip cradle assembly configured to support the tip portion of the rotor blade. At least one of the tip cradle assembly or the root cradle assembly may be movable relative to the other of the tip cradle assembly or the root cradle assembly to allow the tip portion to be spaced apart from the root portion after the rotor blade has been divided between the root and tip portions. In addition, the system may include an insert cradle assembly configured to support a blade insert for the rotor blade. The insert cradle assembly may be configured to be positioned between the root cradle assembly and the tip cradle assembly so as to position the blade insert between the root portion and the tip portion.

20 Claims, 13 Drawing Sheets

SYSTEM AND METHOD FOR INSTALLING A BLADE INSERT BETWEEN SEPARATE PORTIONS OF A WIND TURBINE ROTOR BLADE

FIELD OF THE INVENTION

The present subject matter relates generally to wind turbines and, more particularly, to a system and method for installing a blade insert between root and tip portions of a wind turbine rotor blade.

BACKGROUND OF THE INVENTION

Wind power is considered one of the cleanest, most environmentally friendly energy sources presently available, and wind turbines have gained increased attention in this regard. Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

The particular size of the rotor blades is a significant factor contributing to the overall efficiency of a wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative energy source.

Previous efforts have been made to extend the length of installed rotor blades in a retrofit procedure, including replacing the original tip of the rotor blade with a tip extension. This method is problematic, however, because the blade root of the rotor blade is typically not strong enough to support a tip extension having suitable dimensions for making the process financially viable. For example, in many cases, the tip extension would need to add an additional annual energy production (AEP) of approximately 20% to make the replacement financially viable. This generally corresponds to an increase in blade length of approximately seven meters. Yet an original blade root can typically only support an increase in tip length of approximately two meters (2 m). Further, such replacement efforts to extend blade length typically involve the use of costly cranes.

Accordingly, a system and method for installing a blade insert between a root portion and a tip portion of a wind turbine rotor blade would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for installing a blade insert between a root portion and a tip portion of a rotor blade of a wind turbine. The system may include a root cradle assembly configured to support the root portion of the rotor blade and a tip cradle assembly configured to support the tip portion of the rotor blade. At least one of the tip cradle assembly or the root cradle assembly may be movable relative to the other of the tip cradle assembly or the root cradle assembly to allow the tip portion to be spaced apart from the root portion after the rotor blade has been divided between the root and tip portions. In addition, the system may include an insert cradle assembly configured to support a blade insert for the rotor blade. The insert cradle assembly may be configured to be positioned between the root cradle assembly and the tip cradle assembly so as to position the blade insert between the root portion and the tip portion.

In another aspect, the present subject matter is directed to a method for installing a blade insert between a root portion and a tip portion of a rotor blade of a wind turbine. The method may include supporting the root portion of the rotor blade with a root cradle assembly, supporting the tip portion of the rotor blade with a tip cradle assembly, dividing the rotor blade between the root portion and the tip portion, moving at least one of the tip cradle assembly or the root cradle assembly so as to space the tip portion apart from the root portion, positioning an insert cradle assembly between the root cradle assembly and the tip cradle assembly, wherein the insert cradle assembly supports a blade insert for the rotor blade, and securing the blade insert between the root portion and the tip portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
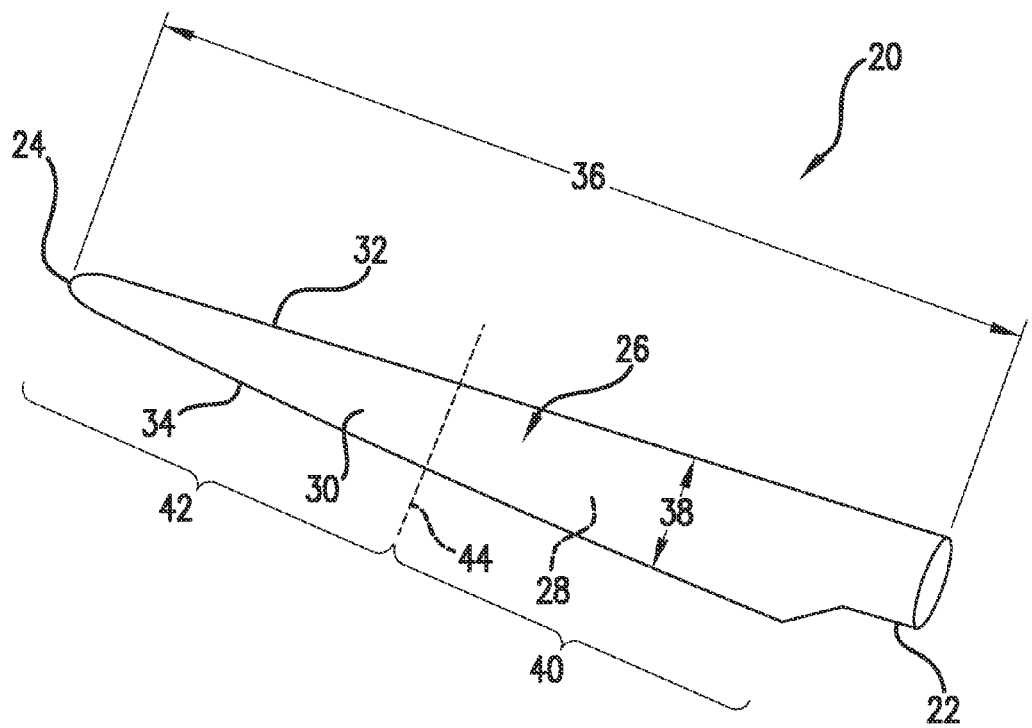
FIG. 1 illustrates a perspective view of one embodiment of a rotor blade.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for installing a blade insert between separate portions of a wind turbine rotor blade. Specifically, in several embodiments, various cradle assemblies are disclosed that allow a rotor blade to be supported relative to the ground while the blade is being divided into two separate portions (i.e., a root portion and a tip portion) and a blade insert is being installed between the separate portions. Such cradle assemblies eliminate the need for a crane to be available to support the rotor blade while it is being divided and the blade insert is being installed, thereby reducing installation costs and decreasing the complexity of the process. Additionally, by using the disclosed system and method to install a blade insert between separate portions of a rotor blade, the effective length or span of the resulting rotor blade may be increased significantly without comprising the structural integrity of the blade, thereby providing a significant improvement over rotor blades having tip extensions installed thereon.

Referring now to the drawings, FIG. 1 illustrates a perspective view of one embodiment of a rotor blade 20 suitable for use on a wind turbine (not shown). As shown, the rotor blade 20 generally includes a blade root 22 configured for mounting the rotor blade 20 to the hub (not shown) of the wind turbine and a blade tip 24 disposed opposite the blade root 20. A body 26 of the rotor blade 20 may generally be configured to extend between the blade root 22 and the blade tip 24 and may serve as the outer casing/skin of the blade 20. In several embodiments, the body 26 may define a substantially aerodynamic profile, such as by defining a symmetrical or cambered airfoil-shaped cross-section. As such, the body 26 may include a pressure side 28 and a suction side 30 extending between a leading edge 32 and a trailing edge 34. Further, the rotor blade 20 may have a span 36 defining the total length between the blade root 22 and the blade tip 24 and a chord 38 defining the total length between the leading edge 32 and the trailing edge 34. As is generally understood, the chord 38 may vary in length with respect to the span 36 as the rotor blade 20 extends from the blade root 22 to the blade tip 24.

In several embodiments, the body 26 of the rotor blade 20 may be formed as a single, unitary component. Alternatively, the body 26 may be formed from a plurality of shell components. For example, the body 26 may be manufactured from a first shell half generally defining the pressure side 28 of the rotor blade 20 and a second shell half generally defining the suction side 30 of the rotor blade 20, with the shell halves being secured to one another at the leading and trailing edges 32, 34 of the blade 20. Additionally, the body 26 may generally be formed from any suitable material. For instance, in one embodiment, the body 26 may be formed entirely from a laminate composite material, such as a carbon fiber reinforced laminate composite or a glass fiber reinforced laminate composite. Alternatively, one or more portions of the body 26 may be configured as a layered construction and may include a core material, formed from a lightweight material such as wood (e.g., balsa), foam (e.g., extruded polystyrene foam) or a combination of such materials, disposed between layers of laminate composite material.

It should be appreciated that the rotor blade 20 may also include one or more longitudinally extending structural components configured to provide increased stiffness, buckling resistance and/or strength to the rotor blade 20. For example, in several embodiments, the rotor blade 20 may include one or more shear webs (not shown) extending between corresponding spar caps (not shown). However, in other embodiments, the rotor blade 20 of the present disclosure may have any other suitable internal configuration.

Additionally, in several embodiments, the body 26 of the rotor blade 20 may include both a root portion 40 and a tip portion 42. The root portion 40 may extend from the blade root 22 to a reference cut line 44 defined between the blade root 22 and the blade tip 24. The tip portion 42 may extend from the reference cut line 44 to the blade tip 24. In general, the reference cut line 44 may correspond to a reference line along which the rotor blade 20 is cut or otherwise divided in two in order to accommodate a blade insert 46 (FIG. 2) for the lengthening the rotor blade 20. Thus, as used herein, the term "root portion" may refer to the portion of the rotor blade 20 extending from the blade root 22 to the reference cut line 44 (i.e., prior to dividing the rotor blade 20 in two) and/or the portion of the rotor blade 20 extending from the blade root 22 to a joint end 48 (FIG. 2) defined at the cut line 44 (i.e., the end of the root portion 40 after dividing the blade 20 in two). Similarly, the term "tip portion" may refer to the portion of the rotor blade 20 extending from the blade tip 24 to the reference cut line 44 (i.e., prior to dividing the rotor blade 20 in two) and/or the portion of the rotor blade 20 extending from the blade tip 22 to a joint end 50 defined at the cut line 44 (i.e., the end of the tip portion 42 after dividing the blade 20 in two).

It should be appreciated that the cut line 44 may generally be located at any suitable position along the span 36 of the rotor blade 20. For example, in one embodiment, the distance of the cut line 44 from the blade root 22 may range from about 40% to about 95% of the span 36, such as from about 40% to about 80% of the span 36 or from about 50% to about 65% of the span 36. However, it is foreseeable that, in other embodiments, the distance of the cut line 44 from the blade root 22 may be less than 40% of the span 36 or greater than 95% of the span 36.

Figure 2:
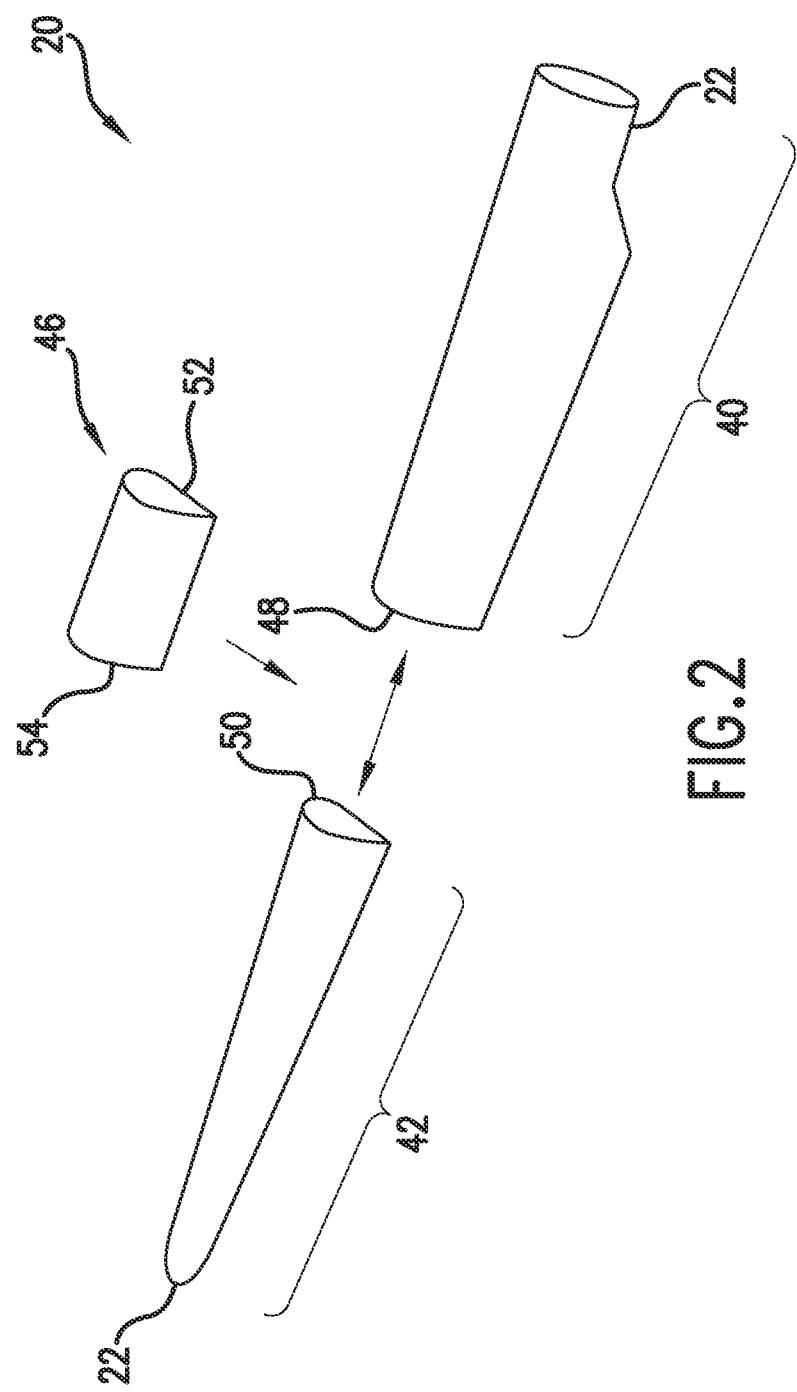
FIG. 2 illustrates a perspective view of the rotor blade shown in FIG. 1 after the blade has been cut or otherwise divided in two, particularly illustrating a blade insert to be installed between root and tip portions of the rotor blade.

Referring now to FIG. 2, the rotor blade 20 is illustrated after being cut or otherwise divided in two. Specifically, as shown, after the dividing the rotor blade 20 at the cut line 44 (FIG. 1), the root portion 40 (i.e., extending from the blade root 22 to the joint end 48) may be separated from the tip portion 42 (i.e., extending from the blade tip 24 to the joint end 50). Thereafter, a blade insert 46 may be installed between the root and tip portions 40, 42 to increase the effective length or span of the rotor blade 20, with a first end 52 of the blade insert 46 being secured to the joint end 48 of the root portion 40 and a second end 54 of the blade insert 46 being secured to the joint end 50 of the tip portion 42.

It should be appreciated that, in general, the blade insert 46 may have any suitable configuration known in the art. In several embodiments, the blade insert 46 may be configured the same as or similar to the body 26 of the rotor blade 20. For example, the blade insert 46 may be configured to define an aerodynamic profile generally corresponding to the aerodynamic profile of the rotor blade 20. In addition, the blade insert 46 may include one or more internal structural components (e.g., one or more shear webs and corresponding spar caps).

It should be also be appreciated that, as used herein, the terms "root portion" and "tip portion" need not be limited to a single, continuous section of the rotor blade 22. For example, the root portion 40 may be formed from a single, unitary blade segment extending between the blade root 22 and the joint end 48 (or cut line 44) or the root portion 40 may be formed from two or more blade segments that, when coupled together, extend between blade root 22 and the joint end 48 (or cut line 44). Similarly, the tip portion 42 may be formed from a single, unitary blade segment extending between the blade tip 22 and the joint end 50 (or cut line 44) or the tip portion 42 may be formed from two or more blade segments that, when coupled together, extend between the blade tip 22 and the joint end 50 (or cut line 44).

Figure 3:
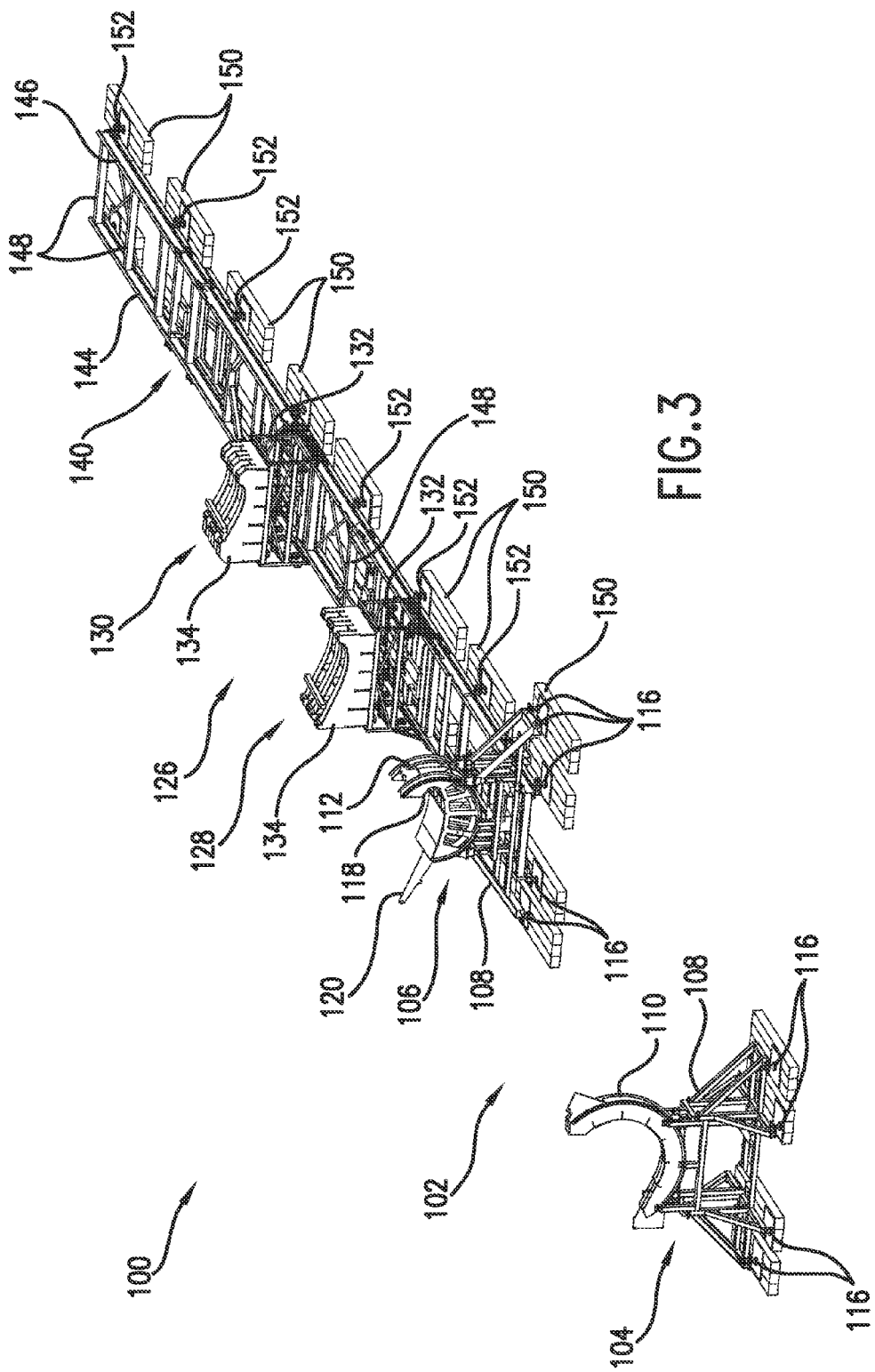
FIG. 3 illustrates a perspective view of various components that may be included within one embodiment of a system for installing a blade insert between separate portions of a rotor blade in accordance with aspects of the present subject matter.
Figure 4:
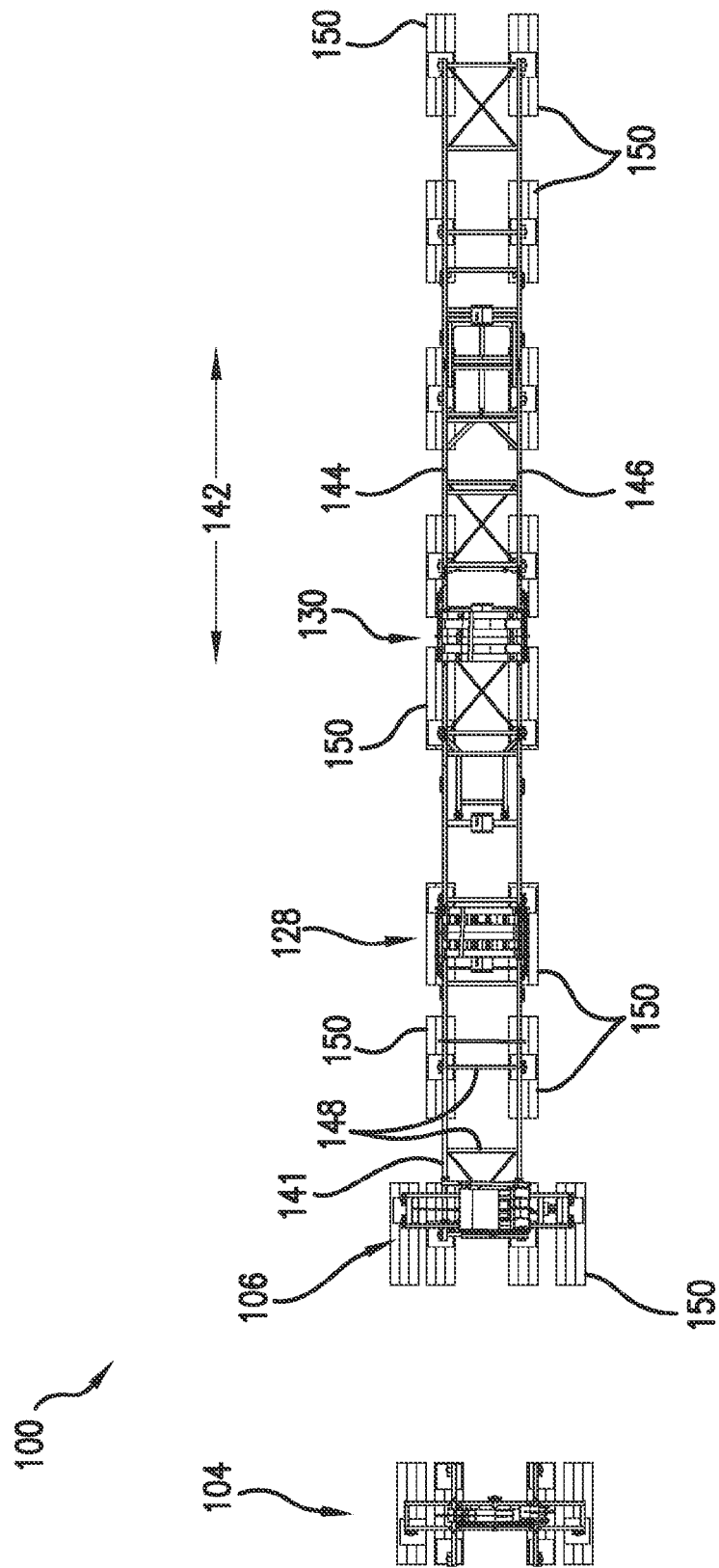
FIG. 4 illustrates a top view of the system components shown in FIG. 3.
Figure 5:
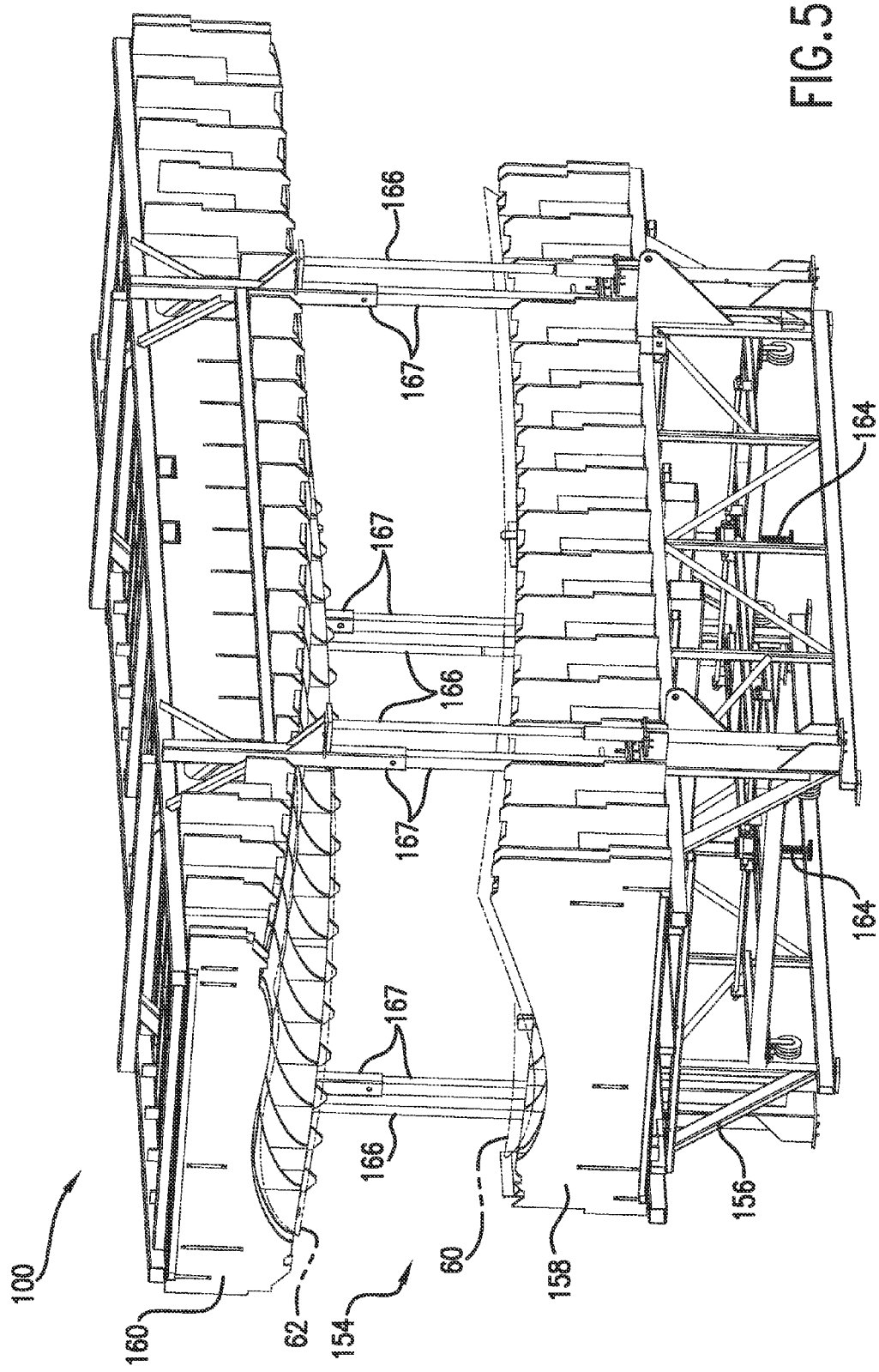
FIG. 5 illustrates a perspective view of other components that may be included within the disclosed system in accordance with aspects of the present subject matter.

Referring now to FIGS. 3-5, one embodiment of a system 100 for installing a blade insert 46 between separate portions 40, 42 of a rotor blade is illustrated in accordance with aspects present subject matter. Specifically, FIG. 3 illustrates a perspective view of various components of the system 100 and FIG. 4 illustrates a top view of the system components shown in FIG. 3. Additionally, FIG. 5 illustrates a perspective view of other components that may be included within the system 100.

Figure 6:
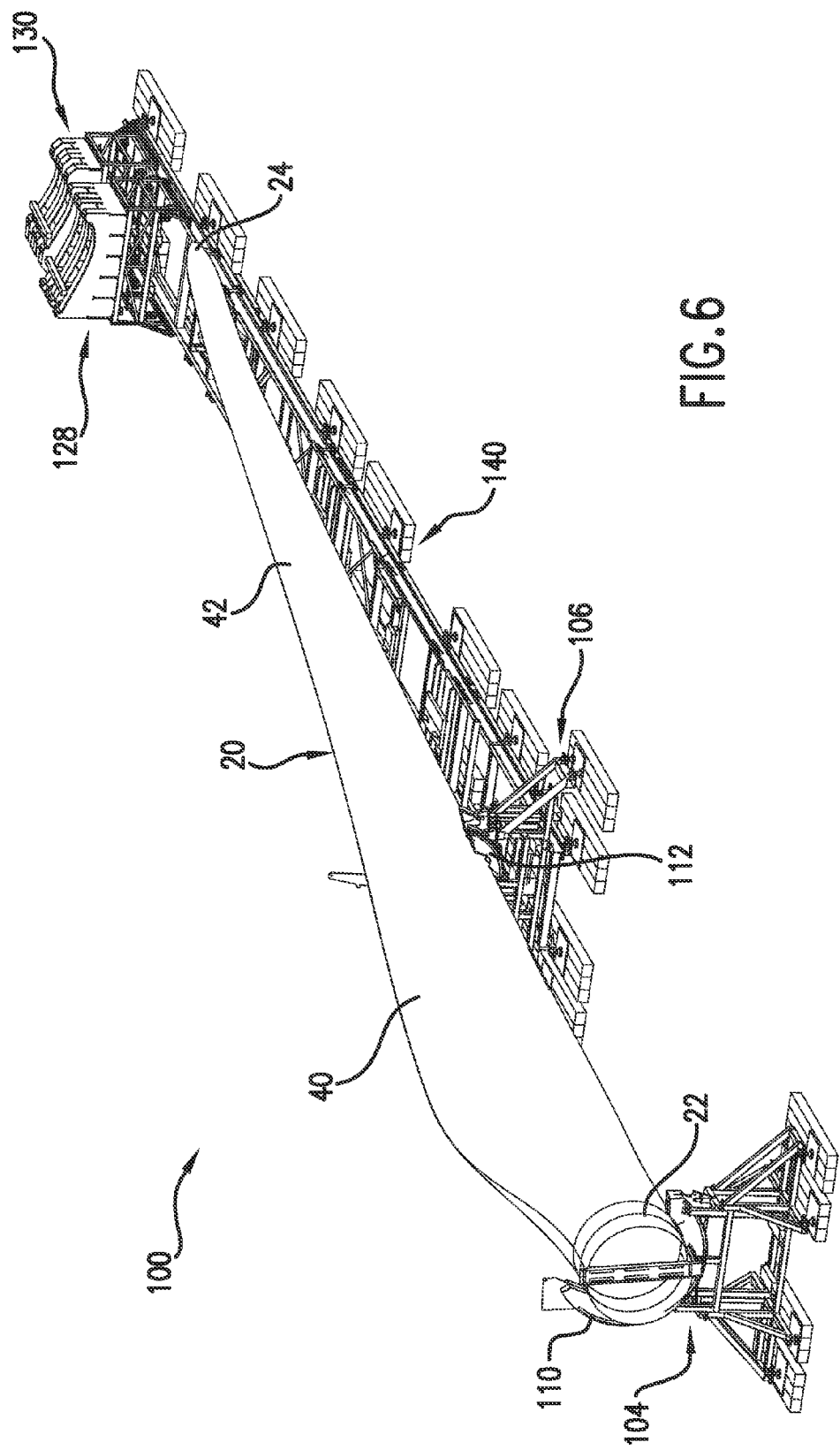
FIG. 6 illustrates a perspective view of a rotor blade supported by root cradles of the disclosed system in accordance with aspects of the present subject matter.
Figure 7:
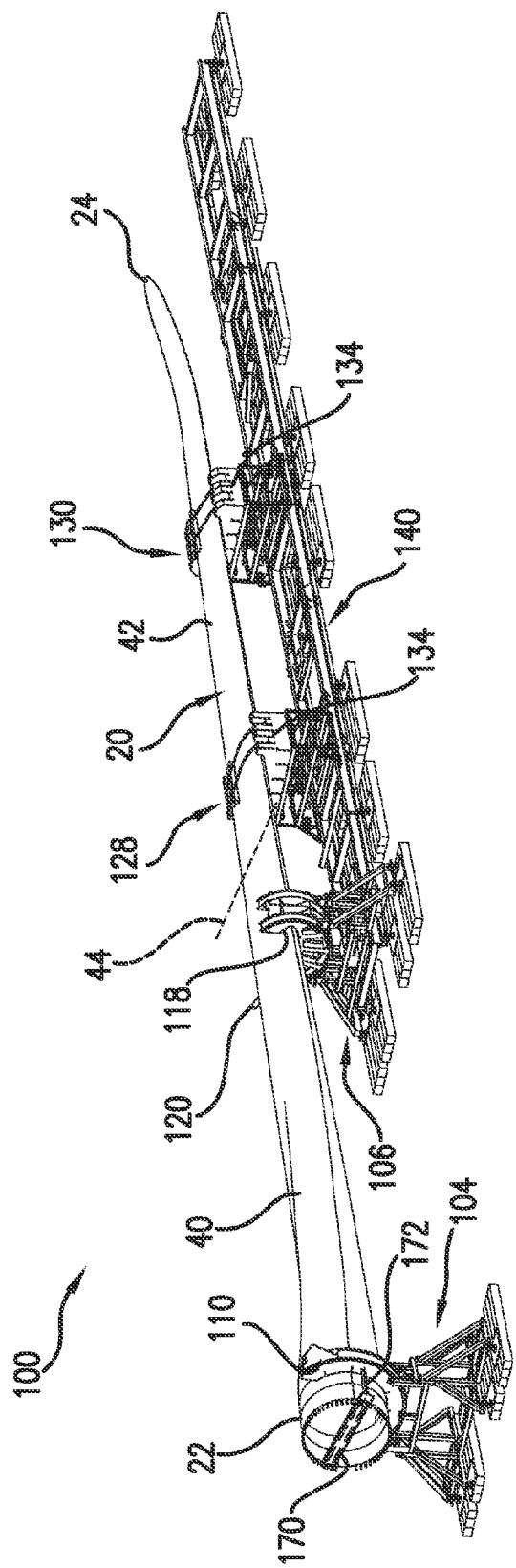
FIG. 7 illustrates a perspective view of the rotor blade shown in FIG. 6 after the rotor blade has been rotated and tip cradles have been positioned underneath the tip portion of the rotor blade.

As shown, the disclosed system 100 may generally include various cradle assemblies for supporting the root and tip portions 40, 42 of the rotor blade 20 while the blade insert 46 is being installed. For example, the system 100 may include a root cradle assembly 102 for supporting the root portion 40 of the rotor blade 20. As shown in FIG. 3, in one embodiment, the root cradle assembly 102 may include a first root cradle 104 and a second root cradle 106. The first root cradle 102 may generally be configured to support a section of the root portion 40 disposed at and/or adjacent to the blade root 22 (e.g., as shown in FIGS. 6 and 7). Similarly, the second root cradle 104 may generally be configured to support a second, more outboard section of the root portion 40 (e.g., as shown in FIGS. 6 and 7). However, in alternative embodiments, the root cradle assembly 102 may simply include a single root cradle configured to support the root portion 40 of the rotor blade 20 or the root cradle assembly 102 may include three or more root cradles configured to support various difference sections of the root portion 40.

As shown in FIG. 3, each root cradle 104, 106 may generally include a stationary base frame 108 and a root nest 110, 112 supported by the base frame 108. Each base frame 108 may generally serve as the primary structural component for supporting both the root nest 110, 112 and the root portion 40 relative to the ground. Thus, each base frame 108 may generally include a plurality of structural members coupled to one another to form a suitable support structure. Additionally, as shown in FIG. 3, each base frame 108 may also include a plurality of leveling members 116 (e.g., screw jacks, leveling pads, etc.) extending from the bottom thereof to permit the root cradles 104, 106 to be leveled relative to the ground. For example, as is generally understood, a height of the leveling members 116 may be manually and/or automatically adjustable to permit the root cradles 104, 106 to be leveled.

The root nest 110, 112 of each root cradle 104, 106 may generally be configured to receive and/or support a section of the root portion 40 of the rotor blade 20. For example, as indicated above, the first root cradle 104 may generally be configured to support the root portion 40 at and/or adjacent to the blade root 22 (e.g., as shown in FIGS. 6 and 7). Thus, as shown in FIG. 3, the root nest 110 for the first root cradle 104 may define a semi-circular shape such that the circular section of the root portion 40 defined at and/or adjacent to the blade root 22 may be received within and/or supported by the root nest 110. Similarly, as indicated above, the second root cradle 106 may be configured to support the root portion 40 at a more outboard location relative to the blade root 22 (e.g., at a location at which the shape of the root portion 40 has transitioned from the circular blade root 22 to a more aerodynamic shape). Thus, as shown in FIG. 3, the root nest 112 for the second root cradle 106 may define a rounded-off cavity 118 and may also include an extension arm 120 extending opposite the cavity 118. As such, when the root portion 40 is positioned onto and/or within the root nest 112, the leading edge of the root portion 40 may be received within the cavity 118 and the trailing edge of the root portion 40 may be supported by the extension arm 120 (e.g., as shown in FIG. 7).

Additionally, in several embodiments, each root nest 110, 112 may be configured to be rotated relative to its corresponding base frame 108. For example, in one embodiment, one or more rollers or other suitable rotational devices may be coupled between each root nest 110, 112 and base frame 108 to allow for relative rotational movement. As will be described below, such relative rotational movement may allow for the rotor blade 20 to be initially supported on the root cradles 104, 106 in a first portion (e.g., a generally vertical position) and subsequently rotated to a second position (e.g., a generally horizontal position).

It should be appreciated that the root nests 110, 112 may be configured to be manually or automatically rotated relative to their corresponding base frames 108. For example, in one embodiment, a suitable actuator(s) (e.g., a hydraulic or pneumatic cylinder) may be used to automatically rotate the root nests 110, 112 relative to the base frames 108. In such an embodiment, the actuator(s) may be installed on both root cradles 104, 106 or the actuator(s) 124 may only be installed one of the root cradles 104, 106 (with the other root cradle being rotated as a result of the rotation of the actuated root cradle).

Referring particularly to FIG. 3, the system 100 may also include a tip cradle assembly 126 for supporting the tip portion 42 of the rotor blade 20. As shown, in one embodiment, the tip cradle assembly 126 may include a first tip cradle 128 and a second tip cradle 130. The first tip cradle 128 may generally be configured to support a first, more inboard section of the tip portion 42 (e.g., at a location adjacent to the cut line 44) and the second tip cradle 130 may generally be configured to support a second, more outboard section of the tip portion 42 (e.g., as shown in FIG. 7). However, in alternative embodiments, the tip cradle assembly 126 may simply include a single tip cradle configured to support the tip portion 42 of the rotor blade 20 or the tip cradle assembly 126 may include three or more tip cradles configured to support the tip portion 42.

As shown in FIG. 3, each tip cradle 128, 130 may generally include a base frame 132 and a tip nest 134 supported by the base frame 132. Each base frame 132 may generally serve as the primary structural component for supporting both the tip nest 134 and the tip portion 42 of the rotor blade 20 relative to the ground. Thus, each base frame 132 may generally include a plurality of structural members coupled to one another to form a suitable support structure. Additionally, similar to the base frame 108 for each root cradle 104, 106, each base frame 132 may also include a plurality of leveling members (not shown) (e.g., screw jacks, leveling pads, etc.) extending from the bottom thereof to permit the tip cradles 128, 130 to be leveled relative to the ground (and/or relative to the rail assembly 140 described below). For example, as is generally understood, a height of the leveling members may be manually and/or automatically adjustable to permit the tip cradles 128, 130 to be leveled.

The tip nest 134 of each tip cradle 128, 130 may generally be configured to support a section of the tip portion 42 of the rotor blade 20. For example, as shown in FIG. 3, each tip nest 134 may define a semi-airfoil-shaped profile generally matching the aerodynamic profile of the rotor blade 20. As such, the tip portion 42 may be seated or nested flush within the tip nests 134 while it is being supported by the tip cradles 128, 130 (e.g., as shown in FIG. 7).

Additionally, in several embodiments, each tip cradle 128, 130 may be coupled to, supported by and/or otherwise associated with any suitable translation or movement device configured for moving the tip cradles 128, 128 relative to the root cradles 104, 106. For example, as shown in FIGS. 3 and 4, the movement device may be a rail assembly 140 on which the tip cradles 128, 130 are movably supported. In such an embodiment, the base frame 132 of each tip cradle 128, 130 may be positioned on the rail assembly 140 in a manner that permits the tip cradles 128, 130 to be moved laterally (i.e., in the direction of arrow 142 (FIG. 4)) along the assembly 140 both towards and away from the root cradles 104, 106. As will be described below, such relative movement between the root and tip cradles 104, 106, 128, 130 may allow for the blade insert 46 to be positioned between the root and tip portions 40, 42 of the rotor blade 20.

As shown in FIGS. 3 and 4, the rail assembly 140 may include a plurality of laterally extending rails (e.g., a first rail 144 and a second rail 146) and a plurality of cross members 148 extending between the rails 144, 146. The rails 144, 146 may generally correspond to any suitable elongated members along which the tip cradles 128, 130 may be moved (e.g., "I-beam" rails). As such, suitable rollers, casters and/or the like (not shown) may be coupled to the bottom of the base frame 132 of each tip cradle 128, 130 to allow the tip cradles 128, 130 to be moved along the rails 144, 146.

Additionally, as shown in the illustrated embodiment, the rails 144, 146 may be positioned on support pads 150 configured to support the rails 144, 146 relative to the ground. For example, as shown in FIG. 3, the rails 144, 146 are supported on the support pads 140 via suitable leveling members 152 (e.g., screw jacks, leveling pads, etc.) extending between the components. Thus, the height of the leveling members 152 may be manually and/or automatically adjusted to permit the rails 144, 146 to be leveled. Moreover, as will be described below, at least a portion of each rail 144, 146 may be pivotally coupled to the remainder of the rail assembly 140. As such, the rails 144, 146 may be pivoted upwards relative to the ground, thereby allowing both the tip cradles 128, 130 and the tip portion 42 of the rotor blade 20 to be moved to an angled orientation relative to both the root cradles 104, 106 and the root portion 40 of the rotor blade 20.

Moreover, in several embodiments, at least a portion of the root cradle assembly 102 may be disposed adjacent to, supported by and/or otherwise associated with a portion of the rail assembly 140. For example, as shown in FIG. 4, in one embodiment, the second root cradle 106 may be disposed adjacent to and/or coupled to a root end 141 of the rail assembly 140.

It should be appreciated that, as an alternative to the rail assembly 140, the disclosed system 100 may include any other suitable translation or movement device for moving the tip cradles 128, 130 relative to the root cradles 104, 106. For example, in one embodiment, the movement device may simply be suitable rollers, casters and/or the like coupled to the bottom of each base frame 132 to allow the tip cradles 128, 130 to be rolled or otherwise moved across the ground or any other support surface relative to the root cradles 104, 106.

It should also be appreciated that, although the root cradles 104, 106 are described herein as being stationary, the root cradles 104, 106 may also be configured to be movable. For example, in one embodiment, the root cradles 104, 106 may be positioned on a suitable rail assembly to allow the root cradles 104, 106 to be moved relative to the tip cradles 128, 130.

Referring particularly now to FIG. 5, the disclosed system 100 may also include an insert cradle assembly 154 configured to support the blade insert 46 to be installed between the root and tip portions 40, 42 of the rotor blade 20. As shown, the insert cradle assembly 154 may include a base frame 156 and one or more insert nests 158, 160 configured to be supported by the base frame 156. The base frame 156 may generally serve as the primary structural component for supporting the insert nest(s) 158, 160 above the ground. Thus, the base frame 156 may generally include a plurality of structural members coupled to one another to form a suitable support structure.

The number of insert nests 158, 160 included within the insert cradle assembly 154 may generally depend on the configuration of the blade insert 46. For example, in several embodiments, the blade insert 46 may be a two piece construction, including both a first shell half 60 (e.g., a suction side shell) and a second shell half 62 (e.g., a pressure side shell). In such embodiments, the insert cradle assembly 154 may generally include a first or lower insert nest 158 configured to receive and/or support the first shell half 60 and a second or upper insert nest 160 configured to receive and/or support the second shell half 62. For example, as shown in FIG. 5, both the lower and upper insert nests 158, 160 may define semi-airfoil shaped profiles configured to match the aerodynamic profiles of each respective shell 60, 62. Alternatively, in embodiments in which the shell halves 60, 62 of the blade insert 46 have been pre-assembled or in embodiments in which the blade insert 46 is constructed as a single, unitary shell, the insert cradle assembly 154 may simply include the lower insert nest 158, with the entire blade insert 46 being supported by such insert nest 158.

Additionally, the insert cradle assembly 154 may also include various actuators for adjusting the position of the insert nest(s) 156, 158. Specifically, as shown in FIG. 5, the insert cradle assembly 154 may include a plurality of actuators 164 coupled between the base frame 156 and the lower insert nest 158 for adjusting the position of the lower insert nest 158 (and the upper insert nest 160 when it is supported on lower insert nest 156) relative to the ground (and/or relative to the root and/or tip cradles 104, 106, 128, 130). For example, in one embodiment, the insert cradle assembly 154 may include one or more actuators 164 positioned at the center of the lower insert nest 158 to generally adjust the vertical position of the insert nest(s) 158, 160 and one or more actuators 164 at each corner of the lower insert nest 158 to allow for more precise adjustments of the orientation of the insert nest(s) 158, 160.

Moreover, as shown in FIG. 5, the insert cradle assembly 154 may also include a plurality of actuators 166 for adjusting the position of the upper insert nest 160 relative to the lower insert nest 158. Specifically, as will be described below, the upper insert nest 158 may be initially supported above the lower insert nest 160. Thereafter, when installing the blade insert 46 between the root and tip portions 40, 42 of the rotor blade 20, the upper insert nest 160 may be lowered (via the actuators 166) onto the lower insert nest 158 to allow the shell halves 60, 62 of the blade insert 46 to be secured together. In addition, the insert cradle assembly 154 may also include guide members 167 (e.g., a female guide member extending from the upper insert nest 160 and a male guide member extending from the lower insert nest 158) extending between the upper and lower insert nests 158, 160 to ensure that the insert nests 158, 160 are properly aligned. It should be appreciated that, in embodiments in which the blade insert is not being installed as a two-piece construction, the insert cradle assembly 154 need not include the actuators 166 and/or the guide members 167.

As indicated above, the present subject matter is also directed to a method for installing a blade insert 46 between separate portions 40, 42 of a rotor blade 20. Various embodiments of such method will be generally described with reference to FIGS. 6-13. However, it should be appreciated that, although the various elements of the disclosed method will generally be described in a particular order (specifically, with reference to the order shown in FIGS. 6-13), the method elements may generally be performed in any sequence and/or order consistent with the disclosure provided herein.

As shown in FIG. 6, the rotor blade 20 may be initially installed within the disclosed system 100 in a cantilevered manner, with the root portion 40 of the rotor blade 20 being supported by the root cradles 104, 106. Specifically, the circular-shaped section of the root portion 40 extending adjacent to the blade root 22 may be positioned within the root nest 110 of the first root cradle 104 and the airfoil-shaped, outboard section of the root portion 40 may be positioned with the root nest 112 of the second root cradle 106 (e.g., with the leading edge being received within the cavity 118 (FIG. 3) defined by the root nest 112). As shown in FIG. 6, in one embodiment, the root nests 110, 112 may be oriented in a manner such that the rotor blade 20 is initially installed in a generally vertical position (i.e., such that the chord line defined between the leading and trailing edges is oriented generally vertically). However, in alternative embodiments, the root nests 110, 112 may have any other suitable orientation for initially installing the root portion 40 of the rotor blade 20 within the root cradles 104, 106. For example, in another embodiment, the root nests 110, 122 may be oriented in a manner such that the rotor blade 20 is initially installed in a generally horizontal position (i.e., such that the chord line is oriented generally horizontally, as shown in FIG. 7).

It should be appreciated that the root portion 40 of the rotor blade 20 may be secured within the root nests 110, 112 using any suitable attachment means known in the art. For example, in several embodiments, suitable straps, cables, ropes and/or the like may be wrapped around the root portion 40 at each root cradle 104, 106 to secure the root portion 40 within the root nests 110, 112.

Referring now to FIG. 7, in embodiments in which the rotor blade 20 is initially installed in a generally vertical position, the rotor blade 20 may then be rotated to a generally horizontal position. For example, as indicated above, the root cradles 104, 106 may include suitable rotational devices for rotating both the root nests 110, 112 and the rotor blade 20 relative to the base frames 108. Thus, the rotor blade 20 may be rotated from the generally vertical position (FIG. 6) to the generally horizontal position (FIG. 7). However, the rotor blade 20 need not be initially installed in the vertical position. For example, as indicated above, the rotor blade 20 may be initially installed within the root nests 110, 112 in the generally horizontal position, thereby eliminating the need to rotate the rotor blade 20.

Regardless, once the rotor blade 20 is in the generally horizontal position, the tip cradles 128, 130 may then be moved to suitable positions for supporting the tip portion 42 of the rotor blade 20. For example, as shown in FIG. 7, the tip cradles 128, 130 may be moved along the rail assembly 140 such that the tip nest 134 of the first tip cradle 128 is generally positioned under and supports a section of the tip portion 42 adjacent to the cut line 44 and the tip nest 134 of the second tip cradle 130 is generally positioned under and supports a more outboard section of the tip portion 42. The tip portion 42 may then be secured to the tip cradles 128, 130 using any suitable attachment means known in the art. For instance, in one embodiment, suitable straps, cables, ropes and/or the like may be wrapped around the tip portion 42 at each tip cradle 128, 130 to secure the tip portion 42 within the tip nests 134.

It should be appreciated that, when initially installing the rotor blade 20 onto the root cradles 104, 106 and/or the tip cradles 128, 130, the disclosed system 100 may include any suitable alignment and/or positioning features that allow the rotor blade to be properly aligned and/or positioned within the root nests 110, 112 and/or tip nests 134. For example, as shown in FIG. 7, in one embodiment, the system 100 may include a positioning member 170 configured to be installed onto the rotor blade 20 at the end of the blade root 22. In such an embodiment, the positioning member 170 may include a spacer arm 172 extending outwardly in the direction of the root nest 110. As such, when installing the root portion 40 onto the root cradles 104, 106, the rotor blade 20 may be moved laterally until the spacer arm 172 contacts the root nest 110, thereby indicating that the root portion 40 is properly positioned within the root nests 110, 112.

After positioning the rotor blade 20 within the root and tip cradles 104, 106, 128, 130, the rotor blade 20 may then be cut or otherwise divided in two along the cut line 44, thereby separating the root portion 40 from the tip portion 42. It should be appreciated that the rotor blade 20 may be divided using any suitable cutting means and/or process known in the art. For example, in one embodiment, the rotor blade 20 may be divided using any suitable hand-held cutting equipment (e.g., by using any suitable manual cutting devices, such as saws, knives, etc., and/or automatic cutting devices, such as electric or gas-powered saws, grinders, etc.) and/or using any suitable cutting machinery (e.g., an EDM machine, water jet cutting machine, etc.).

Figure 8:
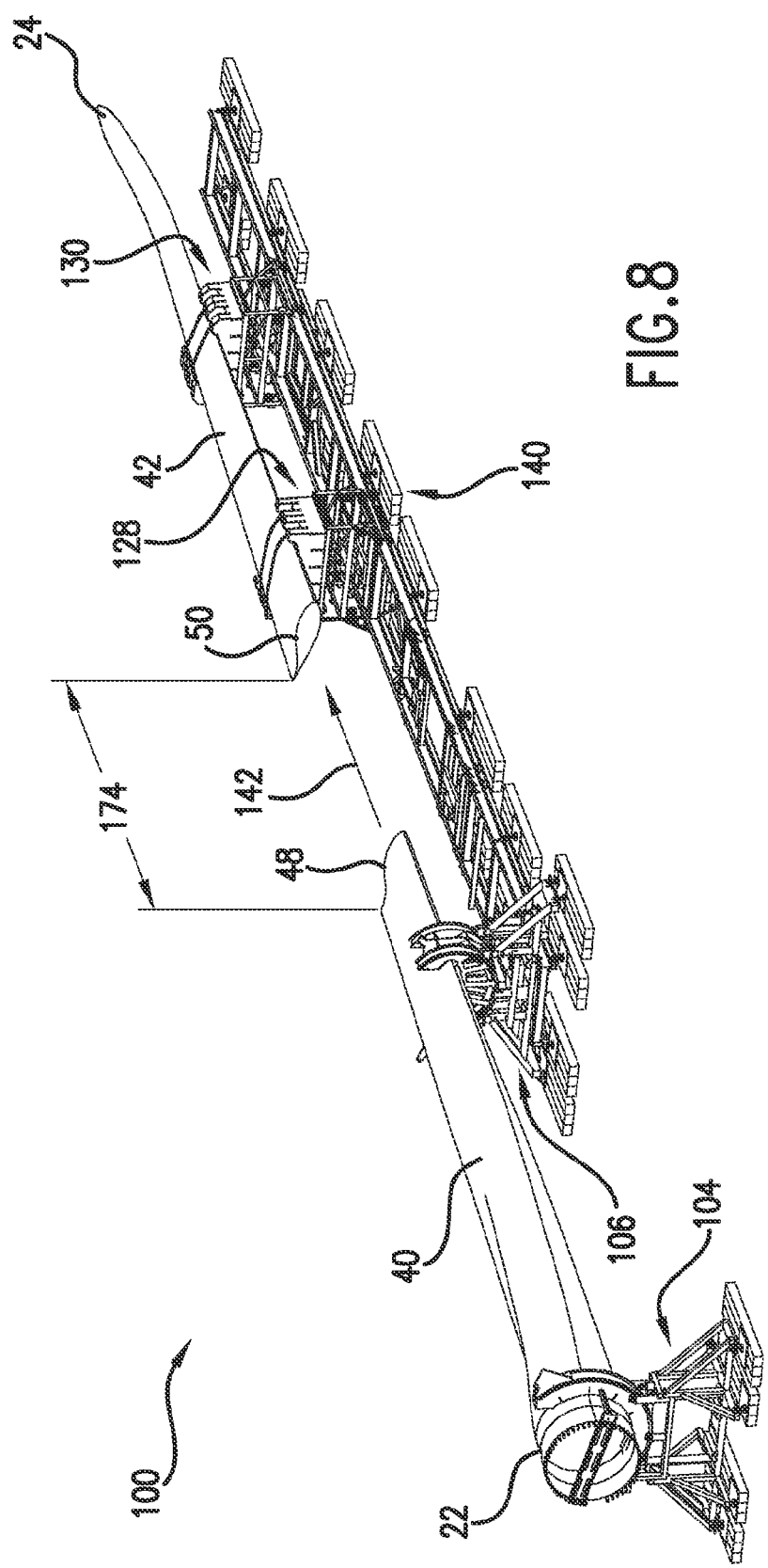
FIG. 8 illustrates a perspective view of the rotor blade shown in FIG. 7 after the rotor blade has been cut or otherwise divided in two and the root and tip portions of the blade have been separated from one another.
Figure 9:
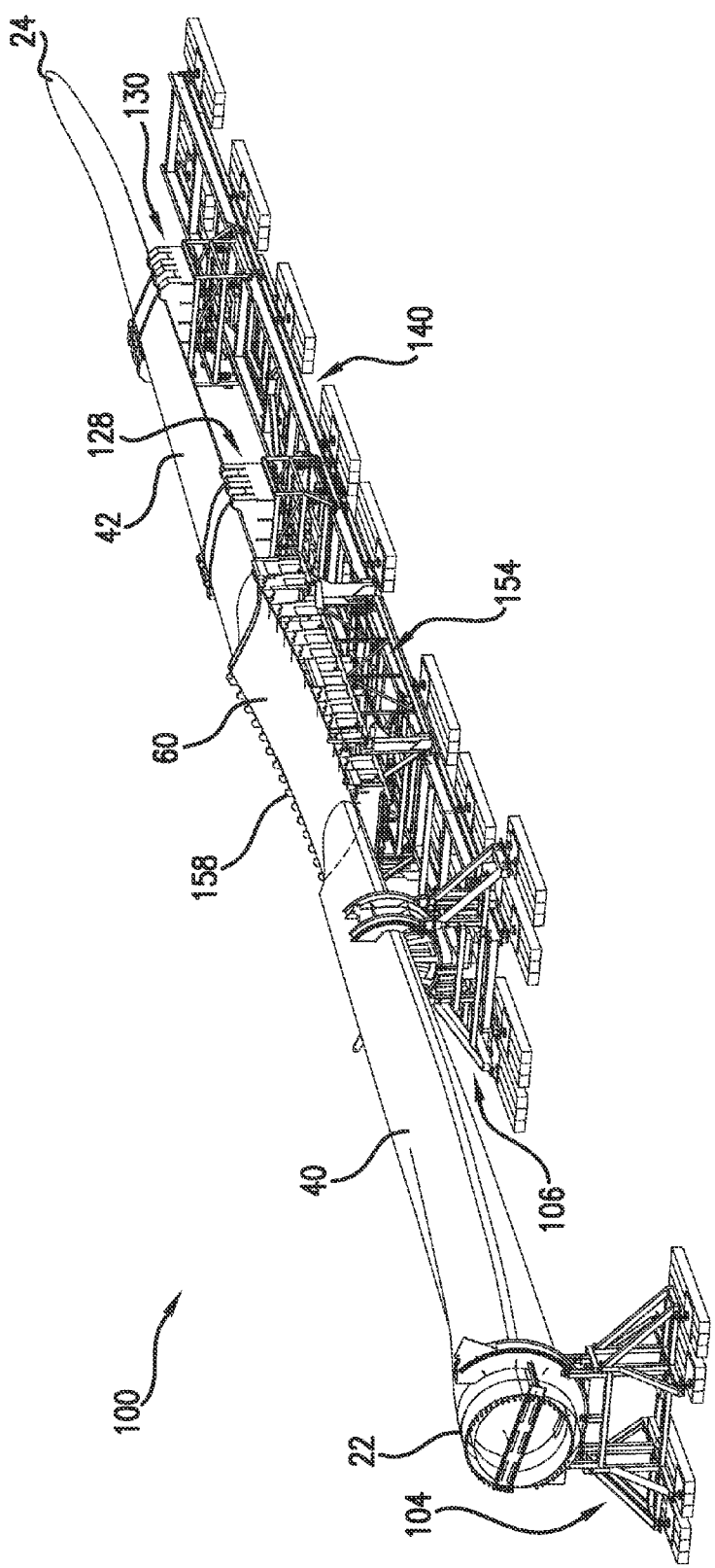
FIG. 9 illustrates a perspective view of the rotor blade shown in FIG. 8 after components of an insert cradle assembly have been positioned between the root and tip cradles.

Referring now to FIGS. 8 and 9, after dividing the rotor blade 20 in two, the root and tip portions 40, 42 may be separated from one another to allow the insert cradle assembly 154 to be positioned between the root and tip cradles 104, 106, 128, 130. For example, as shown in FIG. 8, the tip cradles 128, 130 may be moved laterally (arrow 142) along the rail assembly 140 away from the root cradles 104, 106, thereby defining a gap or distance 174 between the root and tip portions 40, 42. The distance 174 may generally correspond to any suitable length that is sufficient to allow the insert cradle assembly 154 (along with the blade insert 46) to be positioned between the root and tip cradles 104, 106, 128, 130. Thus, as shown in FIG. 9, after moving the tip portion 42 away from the root portion 40, the insert cradle assembly 154 may be positioned between the root and tip cradles 104, 106, 128, 130 (e.g., by positioning the insert cradle assembly 154 onto the rails 144, 146).

Figure 10:
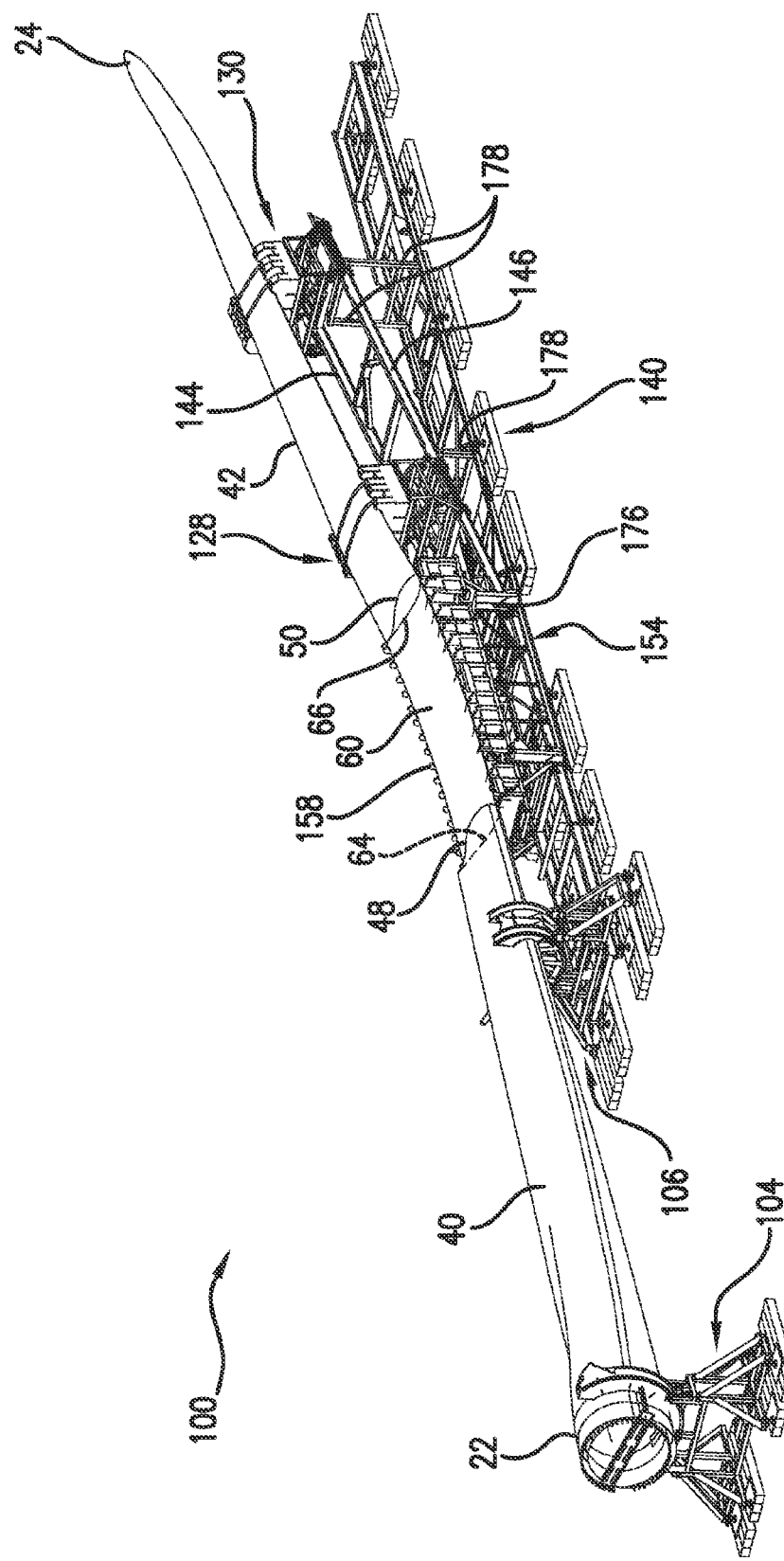
FIG. 10 illustrates a perspective view of the rotor blade shown in FIG. 9 after a first portion of the blade insert has been aligned with the root and tip portions of the blade.

Referring now to FIG. 10, after positioning the insert cradle assembly 154 between the root and tip cradles 104, 106, 128, 130, the blade insert 46 may be aligned with the root and tip portions 40, 42 of the rotor blade 20. For example, in the illustrated embodiment, the blade insert 46 is being installed as a two piece construction (including both a first shell half 60 and a second shell half 62). Thus, in such an embodiment, the first shell half 60 may be initially aligned with the corresponding shell halves of the root and tip portions 40, 42 (e.g., the suction sides of the root and tip portions 40, 42). Thereafter, as will be described below, the second shell half 62 may then be positioned onto the first shell half 60 and aligned with the corresponding shell halves of the root and tip portions 40, 42 (e.g., the pressure sides of the root and tip portions 40, 42).

To align the first shell half 60 with the root and tip portions 40, 42, the position of the lower insert nest 158 may be adjusted relative to the root and tip cradles 104, 106, 128, 130. For example, as indicated above, the insert cradle assembly 154 may include a plurality of actuators 164 configured to adjust the position of the lower insert nest 158. Thus, by carefully adjusting the position of the lower insert nest 158 using the actuators 164, a first edge 64 of the first shell half 60 may be aligned with the corresponding edge at the joint end 48 of the root portion 40 and a second edge 66 of the first shell half 60 may be aligned with the corresponding edge at the joint end 50 of the tip portion 42.

It should be appreciated by those of ordinary skill in the art that rotor blades 20 are often designed with a given amount of pre-bend. As such, it may be necessary to angle the tip portion 42 of the rotor blade 20 relative to the root portion 40 to allow the first shell half 60 to be properly aligned with the tip portion 42. In such instances, as indicated above, a portion of each rail 144, 146 may be configured to be pivoted upwards to allow the tip portion 42 to be angled relative to the root portion 40. For example, as shown in FIG. 10, in several embodiments, a portion of each rail 144, 146 may be hinged at a given hinge point 176 and suitable actuators 178 (e.g., screw jacks, cylinders, such as hydraulic and/or pneumatic cylinders, and/or the like) may be coupled to the hinged portions of the rails 144, 146. As such, the hinged portions of the rails 144, 146 may be pivoted upwards to adjust the position of the tip portion 42, thereby accommodating any pre-bend in the rotor blade 20. It should be appreciated that, in such embodiments, the blade insert 46 may be designed so as to include a given amount of pre-bend, thereby matching the profile of the blade insert 46 to the original profile of the rotor blade 20.

After being properly aligned with the root and tip portions 40, 42 of the rotor blade 20, the first shell half 60 may be secured to the root and tip portions 40, 42 using any suitable means known in the art. For example, in several embodiments, an adhesive may be applied at each interface defined between the first shell half 60 and the joint ends 48, 50 of the root and tip portions 40, 42. In addition to using an adhesive at each interface or as an alternative thereto, sections of the first shell half 60 and the joint ends 48, 50 of the root and tip portions 40, 42 may be scarfed to allow a scarf joint to be formed between the inner and/or outer surfaces of such components. For example, in one embodiment, aligned scarfed sections (not shown) may be formed at the interface defined between the root portion 40 and the first shell half 60 and at the interface defined between the first side shell 60 and the tip portion 42. Thereafter, a wet lay-up process may be utilized to secure the components to one another. For example, a plurality of plies (including a reinforcement material such as glass or carbon fibers) may be positioned across and/or within the aligned scarfed sections and a resin or other suitable matrix material may be rolled over or otherwise applied to the surface of the plies and allowed to cure. A suitable scarfing method that may be utilized in accordance with aspects of the present subject matter is described, for example, in U.S. Pat. No. 7,927,077 (Olson), the disclosure of which is hereby incorporated by reference herein in its entirety for all purposes.

Moreover, in addition to the securing the first shell half 60 to the root and tip portions 40, 42, any internal structural components included within the rotor blade 20 may also be connected across the first shell half 60. For instance, in one embodiment, a shear web (not shown) may be positioned across the first shell half 60 and may be coupled to the shear webs terminating at the joint ends 48, 50 of the root and tip portions 40, 42.

Figure 11:
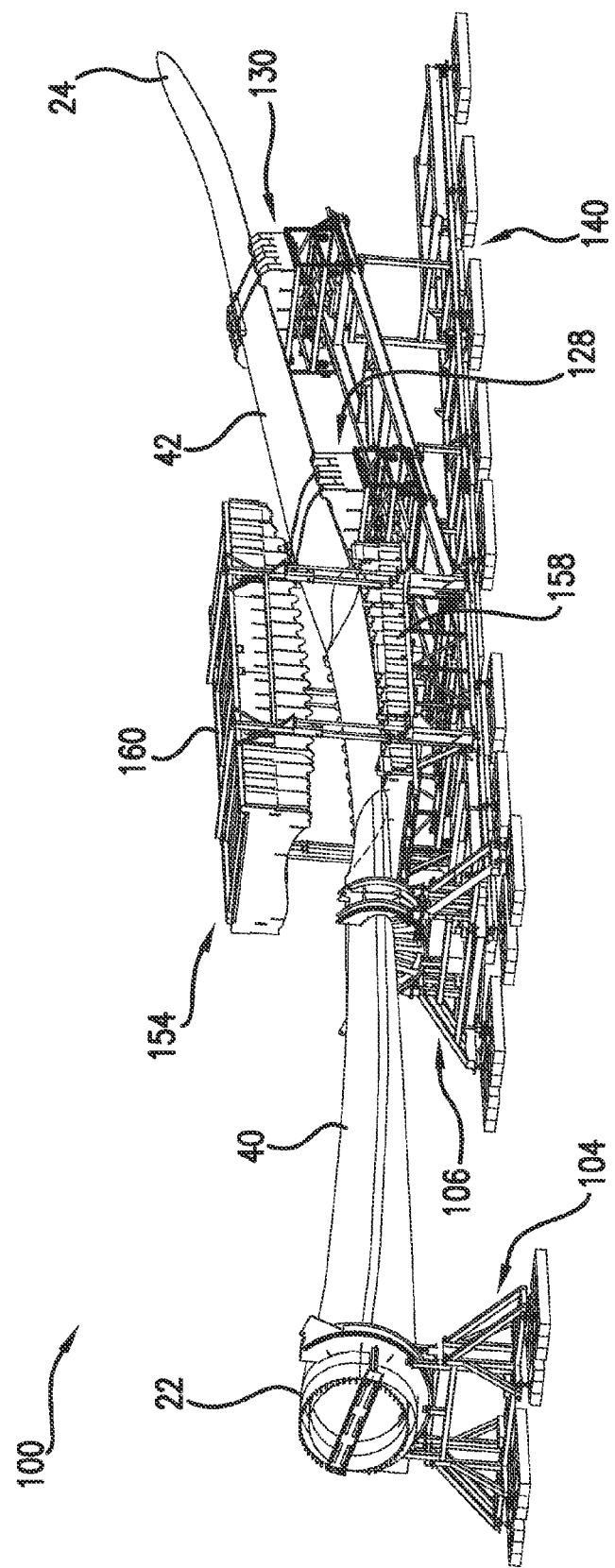
FIG. 11 illustrates a perspective view of the rotor blade shown in FIG. 10 after a second portion of the blade insert has been positioned over the first portion of the blade insert.
Figure 12:
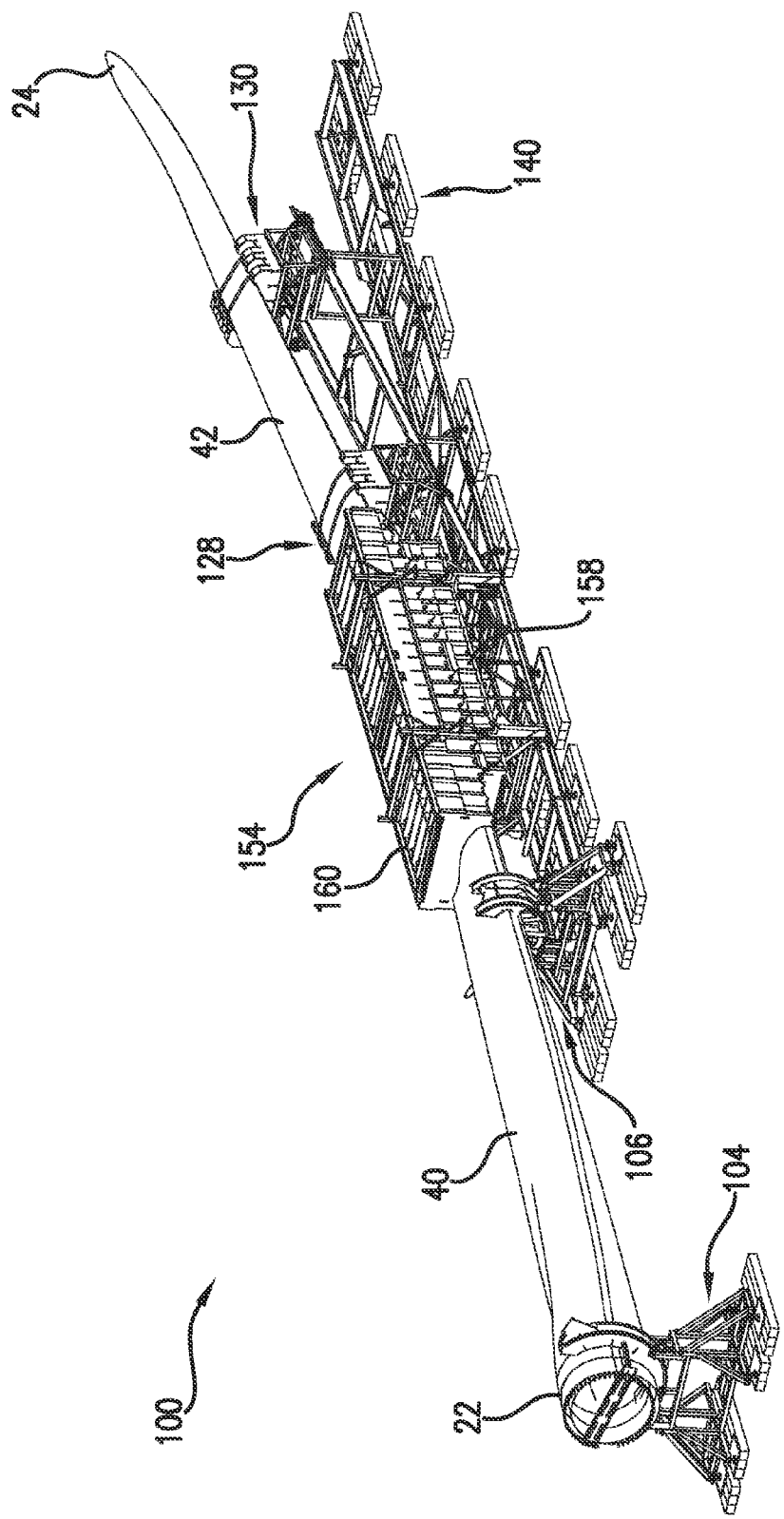
FIG. 12 illustrates a perspective view of the rotor blade shown in FIG. 11 after the second portion of the blade insert has been lowered onto the first portion of the blade insert.

Referring now to FIGS. 11 and 12, after securing the first shell half 60 between the root and tip portions 40, 42, the second shell half 62 may then be installed between the root and tip portions 40, 42. For example, as shown in FIG. 11, the upper insert nest 160 (along with the second shell half 62 (FIG. 5)) may initially be supported above the lower insert nest 158 via the actuators 166 (FIG. 5). Thereafter, as shown in FIG. 12, the upper insert nest 160 may be lowered onto the lower insert nest 158. In doing so, one or more trial runs may be performed to ensure that the second shell half 62 will be properly aligned with both the first shell half 60 and the corresponding sides of the root and tip portions 40, 42. After ensuring proper alignment, a suitable adhesive may be applied around the edges of the first shell half 60 (e.g., along the leading and trailing edges of the first shell half 60) and/or along the top of any shear webs (not shown) extending along the first shell half 60. Thereafter, the upper insert nest 160 may be lowered onto the lower insert nest 158 and held in-place to allow the adhesive to cure between the shell halves 60, 62.

Once the second shell half 62 is positioned onto the first shell half 60, the second shell half 62 may then be secured to the root and tip portions 40, 42 using any suitable means known in the art. For example, in one embodiment, similar to that described above with reference to the first shell half 60, aligned scarfed sections may be formed at the interface defined between the root portion 40 and the second shell half 62 and at the interface defined between the second shell half 62 and the tip portion 42. Thereafter, a wet lay-up process may be utilized to secure the components to one another.

As indicated above, it should be appreciated that, in alternative embodiments, the shells halves 60, 62 of the blade insert 46 may be pre-assembled or the blade insert 46 may simply be formed from a single, unitary shell. In such embodiments, the entire blade insert 46 may be positioned within the lower insert nest 158 and subsequently aligned with the root and tip portions 40, 42 of the rotor blade 20 (e.g., by adjusting the position of the lower insert nest 158 via the actuators 164 and/or by pivoting the tip portion 42 upwards via the actuators 179). Thereafter, the blade insert 46 may then be secured between the root and tip portions 40, 42.

Figure 13:
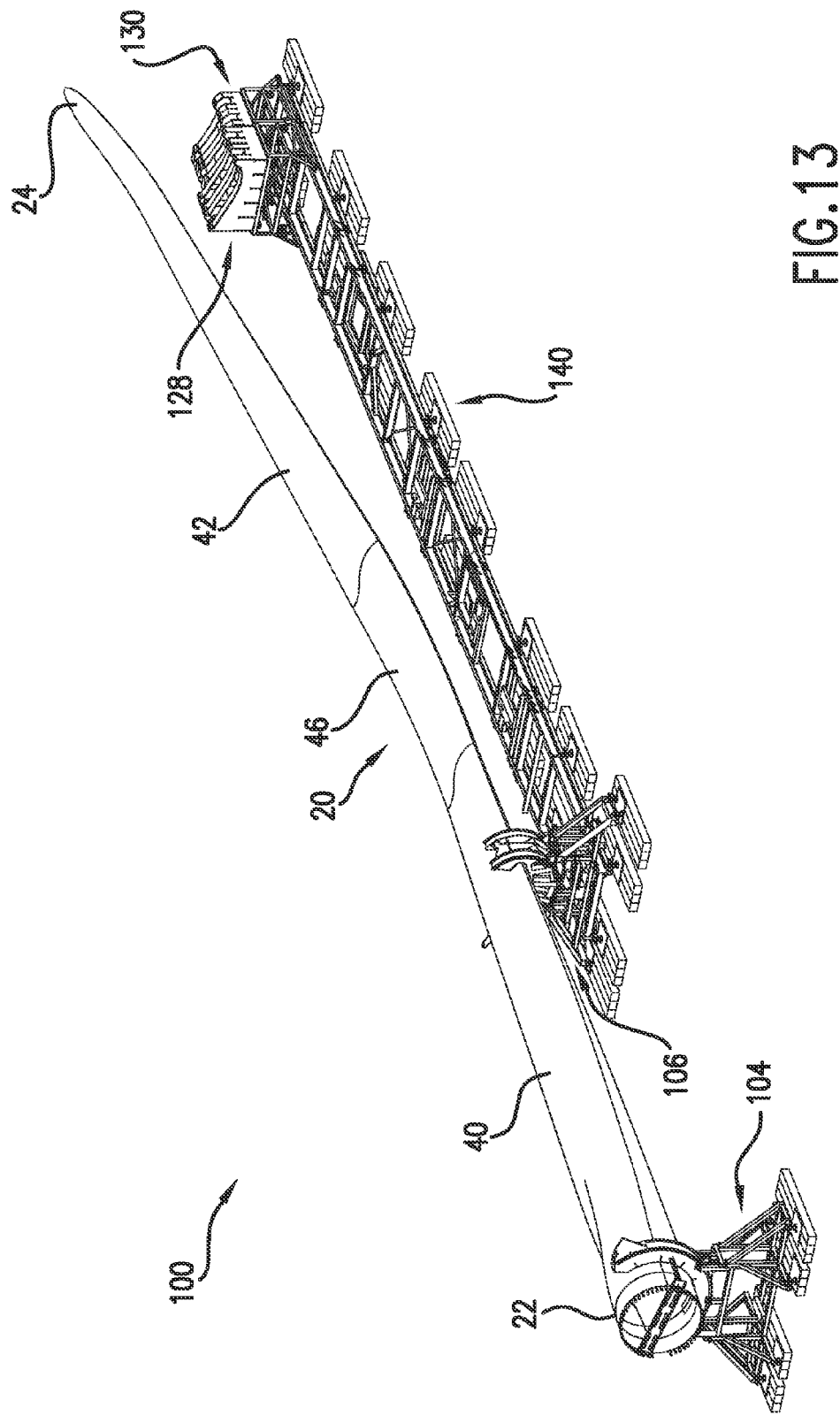
FIG. 13 illustrates a perspective view of the rotor blade shown in FIG. 12 after the blade insert has been fully installed between the root and tip portions of the rotor blade.

Referring now to FIG. 13, after installing the blade insert 46 between the root and tip portions 40, 42, the insert cradle assembly 154 may be removed and the tip portion 40 of the rotor blade 20 detached from the tip cradles 128, 130. Additionally, as shown in FIG. 13, the rails 144, 146 may be pivoted downward and the tip cradles 128, 130 may be moved to the end of the rail assembly 140. The lengthened rotor blade 20 may then be removed from the root cradles 104, 106. Thereafter, a new rotor blade 20 may be installed within the root cradles 104, 106 and the process repeated.

It should be appreciated that, although the root cradle assembly 104, tip cradle assembly 126 and insert cradle assembly 154 have been described herein with reference to a particular embodiment of the present subject matter, such cradle assemblies 104, 126, 154 may generally comprise any suitable components and/or have any suitable configuration that allows the rotor blade 20 and/or blade insert 46 to be supported relative to the ground. For example, in another embodiment, one or more of the cradle assemblies 104, 126, 154 may simply include support pads onto which the rotor blade 20 and/or the blade insert 46 are positioned. In a further embodiment, one or more of the cradle assemblies 104, 126, 154 may include one or more ropes, straps, cables and/or any other suitable devices configured to support the rotor blade 20 and/or blade insert 46 relative to the ground, with such ropes, straps, cables and/or other suitable devices being coupled to any suitable support structure (e.g., a pulley system, a crane and/or the like).

It should also be appreciated that, although the present subject matter has been described with reference to dividing the rotor blade 20 and installing the blade insert 46 while the rotor blade 20 is oriented generally horizontally, the disclosed method may generally be performed while the rotor blade 20 is oriented at any suitable angle. For example, in an alternative embodiment, the disclosed method may be performed while the rotor blade 20 is in the generally vertical position shown in FIG. 6. In such an embodiment, the tip cradles 128, 130 may be modified to allow the tip portion 42 to be supported within the cradles 128, 130 in the vertical position. In addition, the rail assembly 140 may also be modified to allow for relative movement between the root and tip cradles 104, 106, 128, 130. For example, the rails 144, 146 may be curved, arced or otherwise configured to match the curvature or longitudinal profile of the rotor blade 20. Specifically, in the embodiment shown in FIG. 6, the rails 144, 146 may be curved or arced to the right to accommodate the pre-bend in the rotor blade 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for assembling a rotor blade of a wind turbine, the system comprising:
   a root portion of the rotor blade extending lengthwise between a blade root and a first joint end;
   a tip portion of the rotor blade extending lengthwise between a blade tip and a second joint end, the tip portion being separate from the root portion;
   a blade insert extending lengthwise between a first end and a second end, the blade insert being separate from the root and tip portions;
   a root cradle assembly that vertically supports the root portion above the ground;
   a tip cradle assembly that vertically supports the tip portion above the ground, at least one of the tip cradle assembly or the root cradle assembly being movable relative to the other of the tip cradle assembly or the root cradle assembly to allow the second joint end of the tip portion to be spaced apart from the first joint end of the root portion; and
   an insert cradle assembly that vertically supports the blade insert between the root and tip portions such that the first end of the blade insert is positioned adjacent to the first joint end of the root portion and the second end of the blade insert is positioned adjacent to the second joint end of the tip portion.

2. The system of claim 1, wherein the root cradle assembly comprises a first root cradle and a second root cradle, the first root cradle configured to support a first section of the root portion and the second root cradle configured to support a second section of the root portion.

3. The system of claim 2, wherein the first and second root cradles each include a base frame and a root nest, the root nest being rotatable relative to the base frame.

4. The system of claim 2, further comprising a positioning member configured to be coupled to the rotor blade, the positioning member including an arm configured to contact the first root cradle or the second root cradle.

5. The system of claim 1, wherein the tip cradle assembly comprises a first tip cradle and a second tip cradle, the first tip cradle configured to support a first section of the tip portion and the second tip cradle configured to support a second section of the tip portion.

6. The system of claim 1, further comprising a movement device configured to move at least one of the tip cradle assembly or the root cradle assembly relative to the other of the tip cradle assembly or the root cradle assembly.

7. The system of claim 6, wherein the movement device comprises a rail assembly on which the tip cradle assembly is positioned, the tip cradle assembly configured to be moved laterally along the rail assembly relative to the root cradle assembly.

8. The system of claim 7, wherein at least a portion of the root cradle assembly is disposed adjacent to or coupled to a portion of the rail assembly.

9. The system of claim 7, wherein at least a portion of the rail assembly is configured to be moved such that the tip portion is positioned at an angled orientation relative to the root portion.

10. The system of claim 1, wherein the insert cradle assembly includes at least one actuator configured to adjust the position of the blade insert relative to at least one of the tip portion or the root portion.

11. The system of claim 1, wherein the insert cradle assembly comprises a first insert nest and a second insert nest, the first insert nest being configured to support a first shell of the blade insert and the second insert nest being configured to support a second shell of the blade insert.

12. The system of claim 11, wherein the insert cradle assembly includes at least one actuator configured to adjust a position of the second insert nest relative to the first insert nest.

13. A system for installing a blade insert between a root portion and a tip portion of a rotor blade of a wind turbine, the system comprising:
   a root cradle assembly configured to support the root portion of the rotor blade;
   a tip cradle assembly configured to support the tip portion of the rotor blade, at least one of the tip cradle assembly or the root cradle assembly being movable relative to the other of the tip cradle assembly or the root cradle assembly to allow the tip portion to be spaced apart from the root portion after the rotor blade has been divided between the root and tip portions;

an insert cradle assembly configured to support a blade insert for the rotor blade, the insert cradle assembly configured to be positioned between the root cradle assembly and the tip cradle assembly so as to position the blade insert between the root portion and the tip portion; and a rail assembly on which the tip cradle assembly is positioned, the tip cradle assembly being configured to be moved laterally along the rail assembly relative to the root cradle assembly, wherein at least a portion of the rail assembly is configured to be moved such that the tip portion is positioned at an angled orientation relative to the root portion.

14. The system of claim 13, wherein the root cradle assembly comprises a first root cradle and a second root cradle, the first root cradle configured to support a first section of the root portion and the second root cradle configured to support a second section of the root portion.

15. The system of claim 14, wherein the first and second root cradles each include a base frame and a root nest, the root nest being rotatable relative to the base frame.

16. The system of claim 14, further comprising a positioning member configured to be coupled to the rotor blade, the positioning member including an arm configured to contact the first root cradle or the second root cradle.

17. The system of claim 13, wherein the tip cradle assembly comprises a first tip cradle and a second tip cradle, the first tip cradle configured to support a first section of the tip portion and the second tip cradle configured to support a second section of the tip portion.

18. The system of claim 13, wherein at least a portion of the root cradle assembly is disposed adjacent to or coupled to a portion of the rail assembly.

19. The system of claim 13, wherein the insert cradle assembly includes at least one actuator configured to adjust the position of the blade insert relative to at least one of the tip portion or the root portion.

20. The system of claim 13, wherein the insert cradle assembly comprises a first insert nest and a second insert nest, the first insert nest being configured to support a first shell of the blade insert and the second insert nest being configured to support a second shell of the blade insert.

* * * * *